US011300861B2

(12) United States Patent
Miura

(10) Patent No.: US 11,300,861 B2
(45) Date of Patent: Apr. 12, 2022

(54) LIGHT SOURCE APPARATUS SUITABLE FOR IMAGE PROJECTION APPARATUS

(71) Applicant: CANON KABUSHIKI KAISHA, Tokyo (JP)

(72) Inventor: Shun Miura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/410,065

(22) Filed: May 13, 2019

(65) Prior Publication Data

US 2019/0353996 A1 Nov. 21, 2019

(30) Foreign Application Priority Data

May 15, 2018 (JP) .............................. JP2018-094136

(51) Int. Cl.
*G03B 21/20* (2006.01)
*G02B 27/28* (2006.01)
(Continued)

(52) U.S. Cl.
CPC ......... *G03B 21/204* (2013.01); *G02B 27/283* (2013.01); *G03B 21/2066* (2013.01);
(Continued)

(58) Field of Classification Search
CPC .............. G03B 21/204; G03B 21/2066; G03B 21/2073; G03B 21/006; G03B 33/12; G03B 21/20; G03B 33/06; G02B 27/283
See application file for complete search history.

(56) References Cited

U.S. PATENT DOCUMENTS

2010/0225885 A1* 9/2010 Miyazawa ......... G03B 21/2073
353/20
2012/0133846 A1* 5/2012 Ishii ...................... H04N 9/315
348/744
(Continued)

FOREIGN PATENT DOCUMENTS

CN 103543589 A 1/2014
CN 102722074 B 7/2015
(Continued)

OTHER PUBLICATIONS

Extended European Search Report issued by the European Patent Office dated Oct. 9, 2019 in corresponding European Patent Application No. 19173786.5.
(Continued)

*Primary Examiner* — Michelle M Iacoletti
*Assistant Examiner* — Magda Cruz
(74) *Attorney, Agent, or Firm* — Carter, DeLuca & Farrell LLP

(57) ABSTRACT

A light source apparatus includes a light emitting element configured to emit first light, a wavelength conversion element configured to convert part of first light into second light having a wavelength different from that of the first light, and to emit the second light and unconverted light that is the first light which is not converted into the second light, and an optical element configured to cause the first light from the light emitting element to enter the wavelength conversion element, and the second light and the unconverted light from the wavelength conversion element to travel in a direction different from a direction of the light emitting element. The wavelength conversion element emits the second light and the unconverted light as linear polarization light.

11 Claims, 12 Drawing Sheets

(51) Int. Cl.
*G03B 21/00* (2006.01)
*G03B 33/12* (2006.01)

(52) U.S. Cl.
CPC ........ *G03B 21/2073* (2013.01); *G03B 21/006* (2013.01); *G03B 33/12* (2013.01)

(56) References Cited

U.S. PATENT DOCUMENTS

| | | | |
|---|---|---|---|
| 2013/0322056 A1 | 12/2013 | Konuma et al. | |
| 2014/0016098 A1* | 1/2014 | Matsumoto | G02B 27/285 353/20 |
| 2014/0240676 A1 | 8/2014 | Maes et al. | |
| 2015/0153020 A1* | 6/2015 | Akiyama | H04N 9/3194 353/20 |
| 2015/0205189 A1* | 7/2015 | Nojima | H01L 33/501 353/31 |
| 2015/0219314 A1* | 8/2015 | Inoko | F21V 13/08 362/84 |
| 2016/0084478 A1* | 3/2016 | Inoko | F21V 13/08 353/84 |
| 2016/0238923 A1 | 8/2016 | Tanaka et al. | |
| 2017/0244939 A1* | 8/2017 | Arakawa | F21V 29/502 |
| 2018/0017856 A1* | 1/2018 | Tanaka | H04N 9/3158 |
| 2018/0239228 A1* | 8/2018 | Akiyama | G03B 21/204 |
| 2018/0299662 A1* | 10/2018 | Maes | G02B 26/008 |
| 2019/0107771 A1* | 4/2019 | Li | G03B 21/204 |
| 2019/0302589 A1* | 10/2019 | Abe | G03B 21/204 |
| 2019/0310540 A1* | 10/2019 | Maeda | G03B 21/2073 |

FOREIGN PATENT DOCUMENTS

| | | |
|---|---|---|
| CN | 107505807 A | 12/2017 |
| CN | 107660275 A | 2/2018 |
| CN | 108061995 A | 5/2018 |
| CN | 108351585 A | 7/2018 |
| JP | 2010086815 A | 4/2010 |
| JP | 2012108486 A | 6/2012 |
| JP | 2015102818 A | 6/2015 |
| JP | 2015106130 A | 6/2015 |
| JP | 2015522837 A | 8/2015 |
| JP | 2015163947 A | 9/2015 |
| JP | 2015529843 A | 10/2015 |
| JP | 2016145881 A | 8/2016 |
| JP | 2017156403 A | 9/2017 |
| JP | 2017191280 A | 10/2017 |
| WO | 2014024218 A1 | 2/2014 |
| WO | 2016184522 A1 | 11/2016 |

OTHER PUBLICATIONS

Notification of the First Office Action dated Apr. 23, 2021 by the China National Intellectual Property Administration in corresponding CN Patent Application No. 201910386539.8, with English translation.
Communication issued by the European Patent Office dated Nov. 22, 2021 in corresponding EP Patent Application No. 19173786.5.
Notice of Reasons for Rejection issued by the Japan Patent Office dated Feb. 22, 2022 in corresponding JP Patent Application No. 2018-094136, with English translation.

* cited by examiner

LIGHT SOURCE APPARATUS SUITABLE FOR IMAGE PROJECTION APPARATUS

BACKGROUND OF THE INVENTION

Field of the Invention

The present invention relates to a light source apparatus suitable for an image projection apparatus (projector).

Description of the Related Art

One light source apparatus for a projector includes, as disclosed in Japanese Patent Laid-Open No. ("JP") 2015-106130, a wavelength conversion element for converting the wavelength of light from a light emitting element. One wavelength conversion element uses an organic fluorescent body having a broadband fluorescence spectrum.

The light source apparatus disclosed in JP 2015-106130 emits fluorescent light as nonpolarized light from the fluorescent body. Hence, a projector that modulates light from a light source apparatus by a light modulation element using polarized light such as a liquid crystal panel requires a polarization conversion element that converts the nonpolarized light into linear polarization light, to be provided in an illumination optical system between the light source apparatus and the light modulation element.

Then, a space is necessary to dispose the polarization conversion element, and the illumination optical system becomes larger. The Etendue of the illumination optical system becomes smaller, and the light utilization efficiency (illumination efficiency) lowers.

SUMMARY OF THE INVENTION

The present invention provides a light source apparatus that can realize a high light utilization efficiency using a wavelength conversion element.

A light source apparatus according to one aspect of the present invention includes a light emitting element configured to emit first light, a wavelength conversion element configured to convert part of first light into second light having a wavelength different from that of the first light, and to emit the second light and unconverted light that is the first light which is not converted into the second light, and an optical element configured to cause the first light from the light emitting element to enter the wavelength conversion element, and the second light and the unconverted light from the wavelength conversion element to travel in a direction different from a direction of the light emitting element. The wavelength conversion element emits the second light and the unconverted light as linear polarization light.

A light source apparatus according to another aspect of the present invention includes a light emitting element configured to emit first light, a wavelength conversion element configured to convert the first light into second light, third light and fourth light having wavelengths different from a wavelength of the first light and from one another, and an optical element configured to cause the first light from the light emitting element to enter the wavelength conversion element, and the second light, the third light, and the fourth light from the wavelength conversion element to travel in a direction different from that of the light emitting element. The wavelength conversion element emits each of the second light, the third light, and the fourth light as linear polarization light.

An image projection apparatus according to another aspect of the present invention includes one of the above light source apparatuses, and a light modulation element configured to modulate light from the light source apparatus, and projects image light from the light modulation element onto a projection surface.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
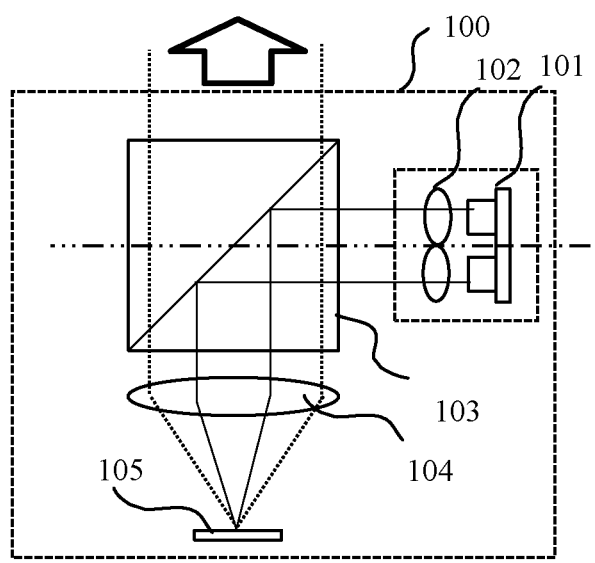
FIG. 1 illustrates a configuration of a light source apparatus according to a first embodiment of the present invention.

FIG. 1 illustrates a configuration of a light source apparatus (light source unit) 100 according to a first embodiment of the present invention. A light source 101 includes blue laser diodes as a plurality of light emitting elements that emit laser beams as linear polarization light. Excitation light (first light) from the light source 101 is converted into parallel light by a collimating optical system 102, is reflected by a dichroic PBS 103 as an optical element, and is irradiated onto a wavelength conversion element 105 by a condensing optical system 104. This embodiment uses a blue laser diode as a light emitting element for the light source 101, but may use any light emitting elements other than a laser diode as long as it emits the blue linear polarization light.

Figure 2A:
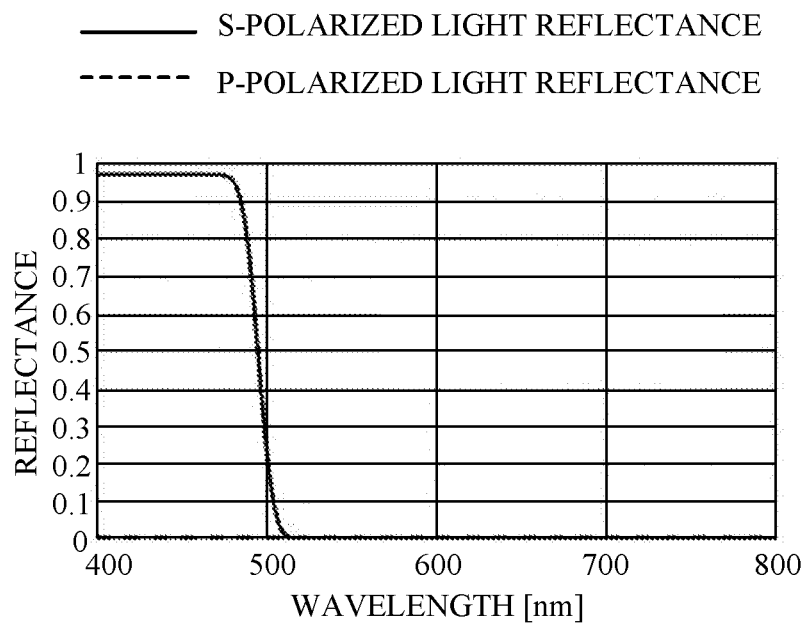
FIGS. 2A and 2B illustrate characteristics of a dichroic PBS according to the first embodiment.

FIG. 2A illustrates an optical characteristic of the dichroic PBS 103 to P-polarized light and S-polarized light. The abscissa axis represents a wavelength (nm) and the ordinate axis represents a reflectance (transmittance). The dichroic PBS 103 has a polarization separation characteristic of reflecting the S-polarized light and of transmitting the P-polarized light for the blue light, and also has a dichroic characteristic of transmitting green light and red light other than the blue light. The excitation light from the light source 101 enters as the S-polarized light the dichroic PBS 103 and is reflected on it.

Figure 3:
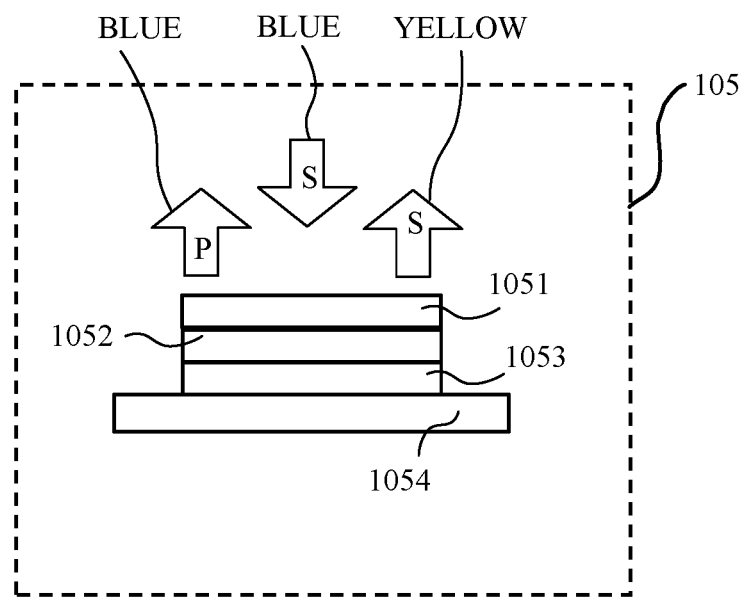
FIG. 3 illustrates a configuration of a wavelength conversion element in the first embodiment.

FIG. 3 illustrates a configuration of the wavelength conversion element 105. The wavelength conversion element 105 includes, in order from the incident side of the excitation light, a wavelength conversion layer (wavelength converter) 1051, a dichroic mirror 1052, a quarter wavelength plate (polarization rotator) 1053, and a reflective diffusion plate (reflector) 1054 as a substrate. The wavelength conversion layer 1051 is made of a wavelength conversion material including a quantum rod, absorbs only the S-polarized light component in the excitation light, converts the wavelength of the light, and emits yellow light (red light and green light) that is the fluorescent light as the S-polarized light. In other words, the quantum rod converts the wavelength of part of the excitation light while maintaining the S-polarized light to generate the fluorescent light (second light). The dichroic mirror 1052 transmits the blue light and reflects the red light and green light.

The fluorescent light as the S-polarized light that travels from the wavelength conversion layer 1051 to the dichroic PBS 103 passes through the condensing optical system 104 and the dichroic PBS 103 and travels (is emitted) to the outside of the light source unit 100. The illumination optical system for a projector described later is provided outside the light source unit. The fluorescent light that has passed from the wavelength conversion layer 1051 to the quarter wavelength plate 1053 and traveled toward the dichroic mirror 1052 is reflected by the dichroic mirror 1052, passes through the wavelength conversion layer 1051, transmits the condensing optical system 104 and the dichroic PBS 103, and travels to the outside of the light source unit 100.

On the other hand, the excitation light having an unconverted wavelength in the wavelength conversion layer 1051 (hereinafter referred to as unconverted light) passes through the dichroic mirror 1052, passes through the quarter wavelength plate 1053, is reflected by the reflecting plate 1054, again passes through the quarter wavelength plate 1053, passes through the dichroic mirror 1052, and enters the wavelength conversion layer 1051. At this time, the unconverted light passes through the quarter wavelength plate 1053 twice, and its polarization direction is rotated by 90°, and the unconverted light becomes the P-polarized light. Hence, the unconverted light is emitted from the wavelength conversion layer 1051 with its wavelength unconverted, passes through the condensing optical system 104 and the dichroic PBS 103, and travels to the outside of the light source unit 100. Since the dichroic PBS 103 transmits the blue P-polarized light, this unconverted light also travels to the outside of the light source unit 100.

The reflective diffusion plate 1054 may simply be a mirror, but may serve as a reflective diffusion plate configured to diffuse the unconverted light as long as the polarization state of the unconverted light is maintained.

The above configuration realizes a light source unit that can emit both the fluorescent light and the unconverted light as linear polarization light (S-polarized light and P-polarized light).

Figure 2B:
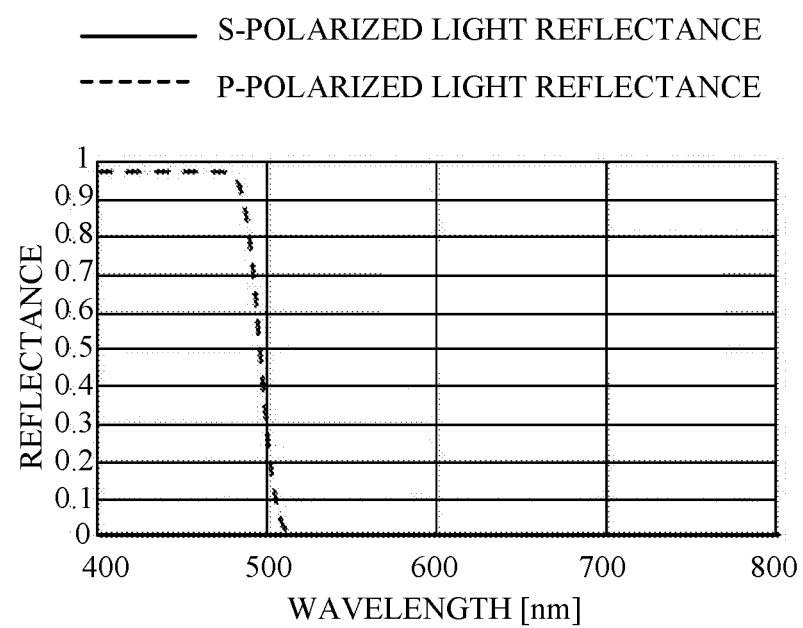

The S-polarized light and the P-polarized light described above may be the P-polarized light and the S-polarized light, respectively. In other words, the dichroic PBS 103 having the optical characteristic illustrated in FIG. 2B may be used (where the abscissa axis represents the wavelength (nm) and the ordinate axis represents the reflectance). Then, the excitation light from the light source 101 enters the dichroic PBS 103 as the P-polarized light and is reflected there. The wavelength conversion layer 1051 absorbs only the P-polarized light component in the excitation light, converts the wavelength, and emits the fluorescent light as the P-polarized light.

This embodiment uses a quantum rod to generate the fluorescent light in the same polarization direction as the polarization direction of the excitation light, but may use an element other than the quantum rod as long as the element that can provide a similar operation due to the fine structure. This is similarly applicable to other embodiments described later.

The substrate of the wavelength conversion element 105 may be a rotating wheel rotationally driven by a motor. This is similarly applicable to the other embodiments described later.

Second Embodiment

Figure 4:
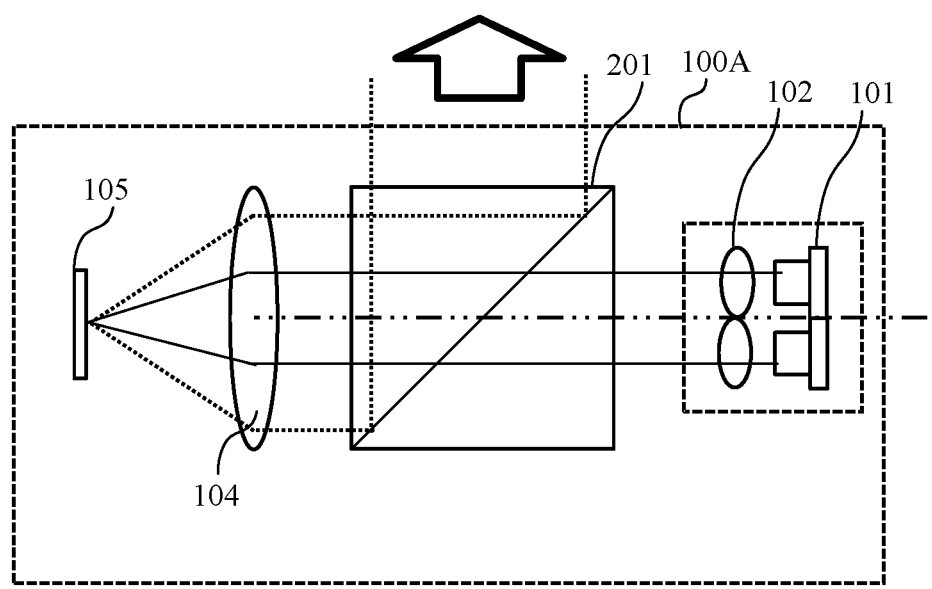
FIG. 4 illustrates a configuration of a light source apparatus according to a second embodiment of the present invention.

FIG. 4 illustrates a configuration of a light source unit 100A according to a second embodiment of the present invention. This embodiment transmits the excitation light from the light source (light emitting element) 101 through a dichroic PBS (polarization beam splitter) 201 as an optical element, while the fluorescent light and the unconverted light from the wavelength conversion element 105 are reflected by the dichroic PBS 201 and emitted to the outside of the light source unit.

Figure 5A:
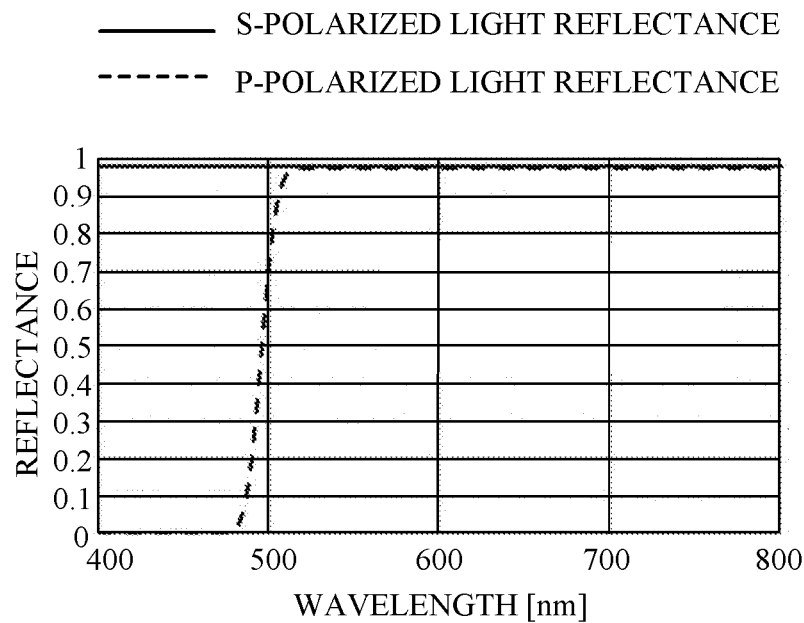
FIGS. 5A and 5B illustrate a characteristic of a dichroic PBS according to the second embodiment.

The dichroic PBS 201 has an optical characteristic illustrated in FIG. 5A. The abscissa axis represents the wavelength (nm) and the ordinate axis represents the reflectance. The dichroic PBS 201 transmits the excitation light as the P-polarized light from the light source 101 through the dichroic PBS 201 and causes the excitation light to enter the wavelength conversion element 105. Unlike first embodiment, the wavelength conversion element 105 generates the fluorescent light of the P-polarized light by a quantum rod and emits the unconverted light as the S-polarized light. The fluorescent light and the unconverted light are reflected by the dichroic PBS 103 and travel to the outside of the light source unit 100A.

This configuration can realize a light source unit configured to emit both the fluorescent light and the unconverted light as the linear polarization light (the P-polarized light and the S-polarized light).

Figure 5B:
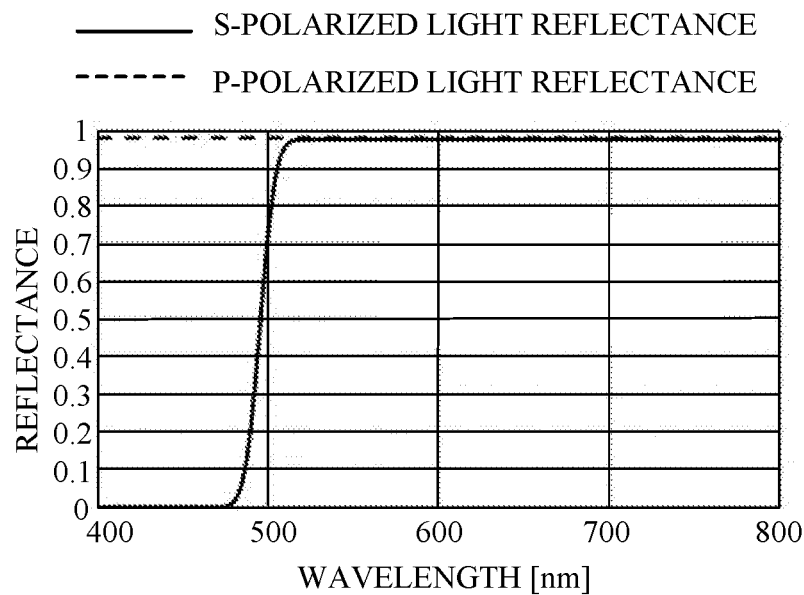

The P-polarized light and the S-polarized light may be the S-polarized light and the P-polarized light, respectively. In other words, a dichroic PBS 201 having the optical characteristic illustrated in FIG. 5B may be used (where the abscissa axis represents the wavelength (nm) and the ordinate axis represents the reflectance). In this case, the excitation light from the light source 101 enters as the S-polarized light the dichroic PBS 201 and is reflected there. The wavelength conversion layer 1051 absorbs only the S-polarized light component in the excitation light, converts the wavelength, and emits the fluorescent light of the S-polarized light. The fluorescent light and unconverted light (blue P-polarized light) pass through the dichroic PBS 103.

Third Embodiment

Figure 6:
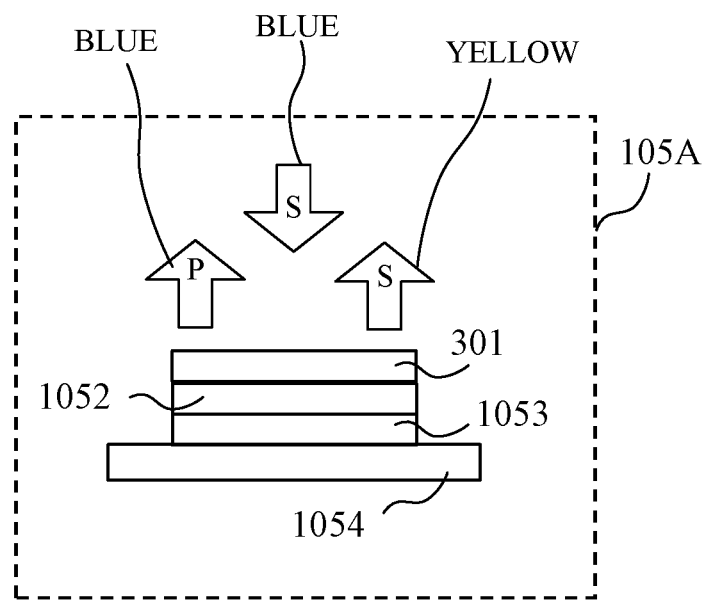
FIG. 6 illustrates a configuration of a wavelength conversion element according to a third embodiment of the present invention.

FIG. 6 illustrates a configuration of a wavelength conversion element 105A used for a light source unit according to third embodiment of the present invention. The configuration of the light source unit other than the wavelength conversion element 105A is the same as that of first embodiment (FIG. 1).

The wavelength conversion element 105A includes, in order from the incident side of the excitation light, a wavelength conversion layer 301, the dichroic mirror 1052, the quarter wavelength plate 1053, and the reflective diffusion plate 1054. The wavelength conversion layer 301 is made of a wavelength conversion material including a quantum rod, absorbs the P-polarized light component in the incident excitation light, converts the wavelength of the light, and emits the fluorescent light as the P-polarized light.

The S-polarized light component in the excitation light has a wavelength unconverted by the wavelength conversion layer 301, passes through the dichroic mirror 1052 and the quarter wavelength plate 1053, and is reflected and diffused by the reflective diffusion plate 1054. The reflected and diffused unconverted light again passes through the quarter wavelength plate 1053 and the dichroic mirror 1052, and enters the wavelength conversion layer 301. The unconverted light is converted into the P-polarized light by passing through the quarter wavelength plate twice, and thus the wavelength of part of the unconverted light is converted after entering the wavelength conversion layer 1051 again. As a result, the fluorescent light as the P-polarized light is generated, and the fluorescent light passes through the dichroic PBS 103 and travels to the outside of the light source unit.

Among the unconverted light that is not converted into the P-polarized light, the unconverted light which has an unconverted wavelength even after entering the wavelength conversion layer 1051 again passes through the dichroic PBS 103 and goes out of the light source unit.

This configuration can realize a light source unit that can emit both the fluorescent light and the unconverted light as the linear polarization light (P-polarized light and P-polarized light). The polarization directions of the fluorescent light and the unconverted light can be aligned with each other.

As described in the first embodiment, the S-polarized light and the P-polarized light in this embodiment may be the P-polarized light and the S-polarized light, respectively. As in the second embodiment, the excitation light may transmit through the dichroic PBS 103 and enter the wavelength conversion element 105A, and the fluorescent light and the unconverted light from the wavelength conversion element 105A may be reflected by the dichroic PBS 103.

Fourth Embodiment

Figure 7:
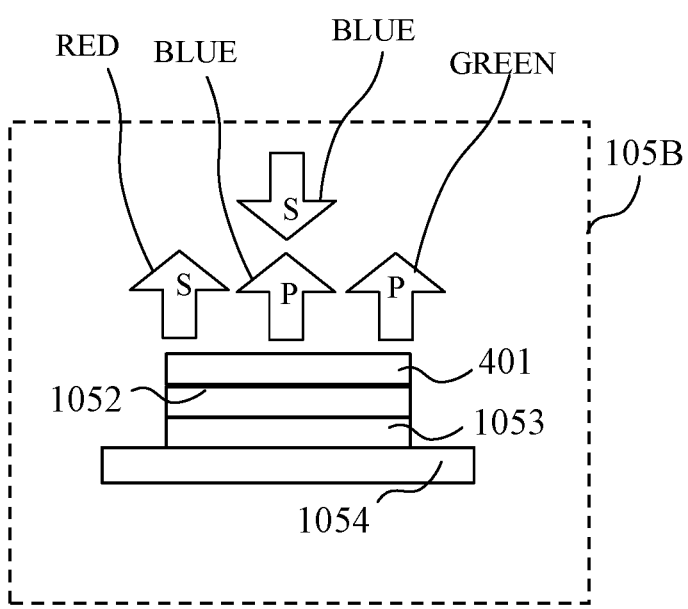
FIG. 7 illustrates a configuration of a wavelength conversion element according to a fourth embodiment of the present invention.

FIG. 7 illustrates a configuration of a wavelength conversion element 105B used for a light source unit according to a fourth embodiment of the present invention. The configuration of the light source unit other than the wavelength conversion element 105B is the same as that of first embodiment (FIG. 1).

Figure 8:
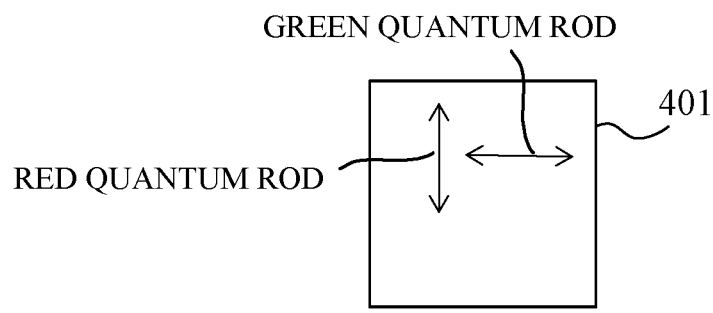
FIG. 8 illustrates an arrangement of quantum rods according to the fourth embodiment.

The wavelength conversion element 105B includes, in order from the incident side of the excitation light, a wavelength conversion layer 401, the dichroic mirror 1052, the quarter wavelength plate 1053, and the reflective diffusion plate 1054. The wavelength conversion layer 401 is made of a wavelength conversion material that includes a red quantum rod that converts the wavelength of the blue light and emits the red light as the fluorescent light and a green quantum rod that converts the wavelength of the blue light and emits the green light as the fluorescent light. As illustrated in FIG. 8, the red quantum rod and the green quantum rod are arranged such that their longitudinal directions or the polarization directions of the red light and the green light emitted from them are orthogonal to each other.

Part of the excitation light incident as the S-polarized light on and reflected by the dichroic PBS 103 has a converted wavelength and is turned into red light while its S-polarized light is maintained in the wavelength conversion layer 401 by the red quantum rod. At this time, as in the first embodiment, the unconverted light passes through the dichroic mirror 1052 and the quarter wavelength plate 1053, and is reflected by the reflective diffusion plate 1054, passes through the quarter wavelength plate 1053 again and the dichroic mirror 1052, and enters the wavelength conversion layer 401. The unconverted light is converted into the P-polarized light by passing through the quarter wavelength plate 1053 twice before and after reflection (forward and return paths) on the reflective diffusion plate 1054, so that it is turned into the green light as the P-polarized light by the wavelength conversion by the green quantum rod in the wavelength conversion layer 401. The unconverted light that has a wavelength unconverted in the return path is emitted as the P-polarized light from the wavelength conversion element 105B. The red light as the S-polarized light, the green light as the P-polarized light, and the unconverted light as P-polarized light all pass through the dichroic PBS 103 and travel to the outside of the light source unit.

This configuration can realize a light source unit that can emit both the fluorescent light and the unconverted light as the linear polarization light while making the polarization directions of the red light and the green light as the fluorescent light different from each other.

As described in the first embodiment, the S-polarized light and the P-polarized light in this embodiment may be the P-polarized light and the S-polarized light, respectively. As in the second embodiment, the excitation light may transmit through the dichroic PBS 103 and enter the wavelength conversion element 105B, and the fluorescent light and the unconverted light from the wavelength conversion element 105B may be reflected by the dichroic PBS 103.

Fifth Embodiment

Figure 9:
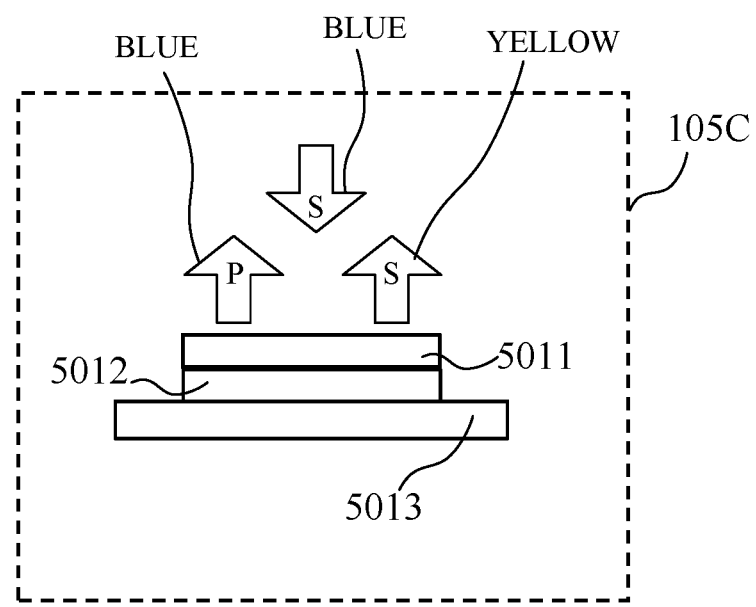
FIG. 9 illustrates a configuration of a wavelength conversion element according to a fifth embodiment of the present invention.

FIG. 9 illustrates a configuration of a wavelength conversion element 105C for a light source unit according to a fifth embodiment of the present invention. The configuration of the light source unit other than the wavelength conversion element 105C is the same as that of the first embodiment (FIG. 1).

The wavelength conversion element 105C according to this embodiment includes, in order from the incident side of the excitation light, a wavelength conversion layer 5011, a wavelength selective polarization rotator (polarization rotator) 5012, and a reflective diffusion plate 5013. The excitation light enters as the S-polarized light the dichroic PBS 103 and is reflected there, and enters the wavelength conversion layer 5011. The wavelength conversion layer 5011 is made of a wavelength conversion material including a quantum rod, absorbs part of the excitation light as the S-polarized light, converts the wavelength of the light, and generates the fluorescent light as the S-polarized light.

Part of the fluorescent light generated in the wavelength conversion layer 5011 and the unconverted light having the wavelength unconverted there enter the wavelength selective polarization rotator 5012. The wavelength selective polarization rotator 5012 is an element that rotates only the polarization direction of the unconverted light (blue light) that passes through it twice and does not rotate the polarization direction of the fluorescent light (red light and green light). The wavelength selective polarization rotator 5012 can be manufactured by laminating a plurality of retardation plates in the axial direction (the passing direction of light) and by bonding the plurality of retardation plates with different thicknesses.

The fluorescent light and the unconverted light that have passed through the wavelength selective polarization rotator 5012 are reflected and diffused by the reflective diffusion plate 5013, pass through the wavelength selective polarization rotator 5012 again, and enter the wavelength conversion layer 5014. At this time, only the polarization direction of the unconverted light is rotated. Thereby, the fluorescent light as the S-polarized light and the unconverted light as the P-polarized light are emitted from the wavelength conversion element 105C. Both the fluorescent light as the S-polarized light and the unconverted light as the P-polarized light pass through the dichroic PBS 103 and travel to the outside of the light source unit.

This embodiment realizes a light source unit that can emit both the fluorescent light and the unconverted light as the linear polarization light (S-polarized light and P-polarized light).

As described in the first embodiment, the S-polarization and the P-polarization in this embodiment may be the P-polarized light and the S-polarized light, respectively. As in the second embodiment, the excitation light may transmit through the dichroic PBS 103 and enter the wavelength conversion element 105C, and the fluorescent light and the unconverted light from the wavelength conversion element 105C may be reflected by the dichroic PBS 103.

As in the third embodiment, the wavelength of the excitation light may be converted not in the forward path but in the return path, or as in the fourth embodiment, a quantum rod may be used to generate the converted light of in a different polarization direction depending on colors.

Sixth Embodiment

Figure 10:
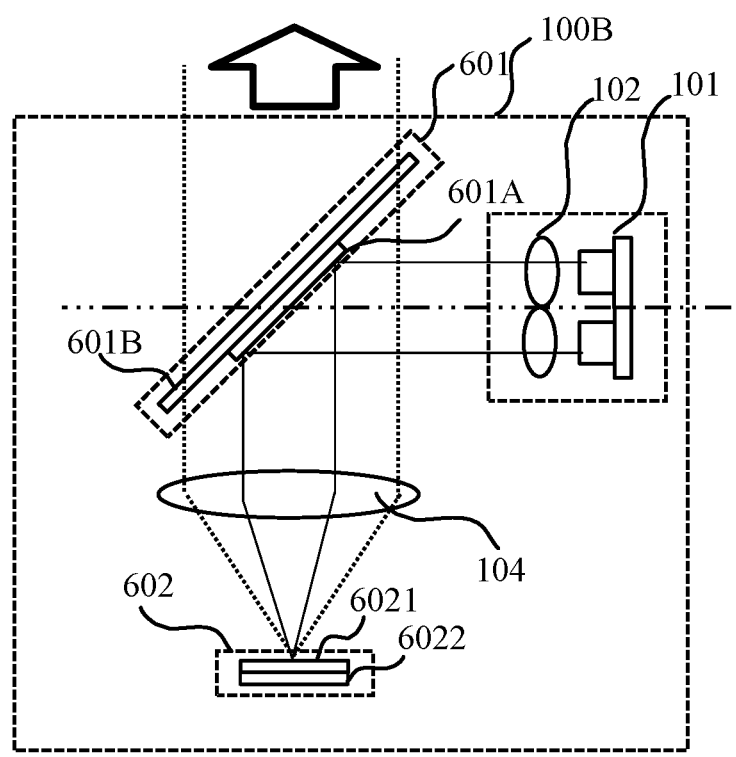
FIG. 10 illustrates a configuration of a light source apparatus according to a sixth embodiment of the present invention.

FIG. 10 illustrates a configuration of a light source unit 100B according to a sixth embodiment of the present invention. This embodiment uses, in place of the dichroic PBS 103 used in the first embodiment, a partial dichroic mirror 601 as an optical element and a wavelength conversion element 602. The configuration of the light source unit other than the partial dichroic mirror 601 and the wavelength conversion element 602 is the same as that of the first embodiment (FIG. 1).

The wavelength conversion element 602 includes a wavelength conversion layer 6021 and a reflective diffusion plate 6022 in order from the incident side of the excitation light.

The partial dichroic mirror 601 is divided into a first region 601A which reflects the blue light and transmits the red light and the green light, and a second region 601B which transmits all of the red light, the green light, and the blue light. The excitation light (blue light) as the linear polarization light from the light source 101 is reflected by the first region 601A and guided to the wavelength conversion element 602. The wavelength conversion layer 6021 in the wavelength conversion element 602 is made of a wavelength conversion material including a quantum rod, and converts a wavelength of the incident excitation light to generate the fluorescent light as the linear polarization light having the same polarization direction as the excitation light.

Part of the excitation light passes through the wavelength conversion layer 6021 without being converted by the wavelength conversion layer 6021, and is reflected and diffused by the reflection diffuser plate 6022. The reflected and diffused unconverted light again enters the wavelength conversion layer 6021, and the wavelength of part of it is converted and the light is turned into the fluorescent light as the linear polarization light while the polarization direction is maintained in the same way as in the forward path. The other part is emitted as the unconverted light from the wavelength conversion layer 6021. As a result, the wavelength conversion element 602 emits the fluorescent light and unconverted light as the linear polarization light having the same polarization direction. Among the fluorescent light and the unconverted light, the unconverted light and the fluorescent light other than the unconverted light reflected by the first region 601A transmit through the partial dichroic mirror 601 (first and second regions 601A and 601B) and travel to the outside of the light source unit 100B.

This configuration realizes a light source unit that can emit both the fluorescent light and the unconverted light as the linear polarization light having the same polarization direction.

The second region 601B may be a region that reflects all of the red light, the green light, and the blue light, and the first region 601A may be a region that transmits only the blue light. At this time, the blue light as the linear polarization light from the light source 101 transmits through the first region 601A and is guided to the wavelength conversion element 602, and the fluorescent light and the unconverted light from the wavelength conversion element 602 are reflected by the partial dichroic mirror 601 and travel to the outside of the light source unit 100B. This configuration is similarly applicable to sixth and seventh embodiments described below.

Seventh Embodiment

According to a seventh embodiment of the present invention, in the light source unit having the same configuration as that in the sixth embodiment, the excitation light is nonpolarized light including both the P-polarization and the S-polarization. The wavelength conversion layer 6021 is sufficiently thick enough to convert all the S-polarized light components in the incident excitation light into the fluorescent light as the S-polarized light. Thereby, the fluorescent light as the S-polarized light and the unconverted light of the P-polarized light are emitted from the wavelength conversion element 602.

This configuration realizes a light source unit that can emit both the fluorescent light and the unconverted light as the linear polarization light (S-polarized light and P-polarized light).

The fluorescent light and the unconverted light may be emitted as the linear polarization light in the same polarization direction from the light source unit by generating the fluorescent light as P-polarized light.

Eighth Embodiment

Figure 11:
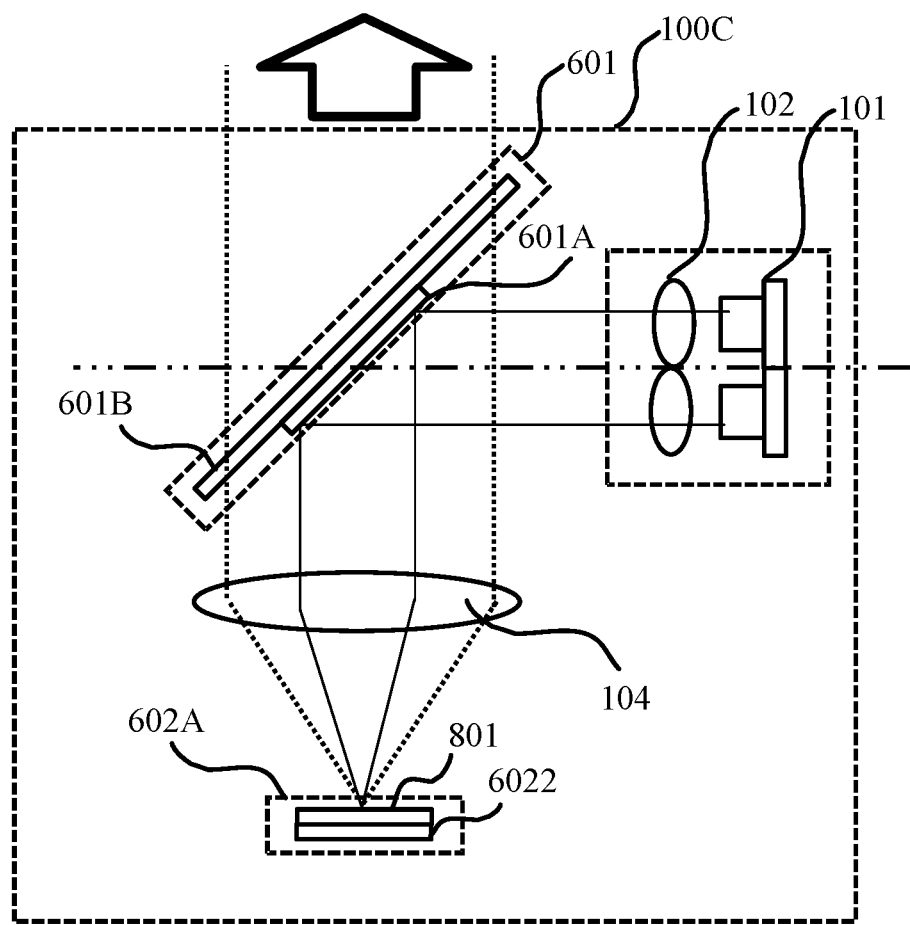
FIG. 11 illustrates a configuration of a light source apparatus according to an eighth embodiment of the present invention.

FIG. 11 illustrates a configuration of a light source unit 100C according to an eighth embodiment of the present invention. In this embodiment, the light source unit 100C has the same configuration as that of the seventh embodiment, a wavelength conversion layer 801 is provided instead of the wavelength conversion layer 6021 in the wavelength conversion element 602 according to the seventh embodiment, and an element 602A having the reflective diffusion plate 6022 is used.

Similar to the wavelength conversion layer 401 described in the fourth embodiment (FIG. 7), the quantum rods for red and the quantum rods for green are disposed in the wavelength conversion layer 801 so that their longitudinal directions are orthogonal to each other. However, the concentration of the red quantum rods is sufficiently higher than that of the green quantum rods.

Even in this embodiment, similar to the seventh embodiment, all the S-polarized light components in the excitation light incident on the wavelength conversion layer 801 are converted into the red fluorescent light as the S-polarized light. Part of the P-polarized light components in the incident excitation light is converted into the green fluorescent light as the P-polarized light. As a result, the red light as the S-polarized light, the green light as the P-polarized light, and the unconverted light as the P-polarized light are emitted from the wavelength conversion element 602A.

The red light in this embodiment may be the P-polarized light. In this case, the green light and the unconverted light have the polarization directions orthogonal to the polarization direction of the red light. Alternatively, the concentration of the green quantum rods may be sufficiently higher than that of the red quantum rods.

Ninth Embodiment

Figure 12:
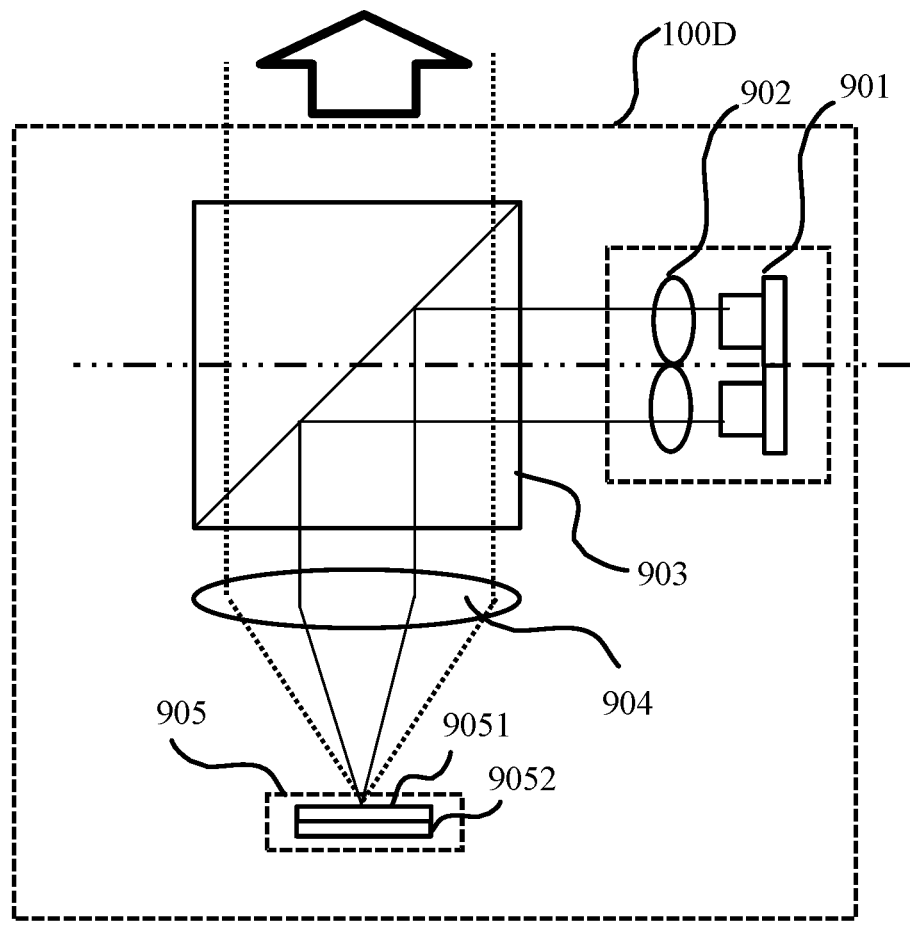
FIG. 12 illustrates a configuration of a light source apparatus according to a ninth embodiment of the present invention.

FIG. 12 illustrates a configuration of a light source unit 100D according to a ninth embodiment according to the present invention. A light source 901 is a laser diode as a light emitting element that outputs ultraviolet light (first light) as the excitation light. The ultraviolet light emitted from a light source 901 is converted into parallel light by a collimating optical system 902, reflected by a dichroic mirror 903 as an optical element, condensed by a condensing optical system 904, and irradiated onto a wavelength conversion element 905.

The wavelength conversion element 905 includes a wavelength conversion layer 9051 and a reflective plate 9052 in order from the incident side of the excitation light. The wavelength conversion layer 9051 is made of a wavelength conversion material including a quantum rod, absorbs the excitation light as the linear polarization light in a predetermined polarization direction, and emits the fluorescent light as the linear polarization light in a predetermined polarization direction without changing the polarization direction.

Figure 13:
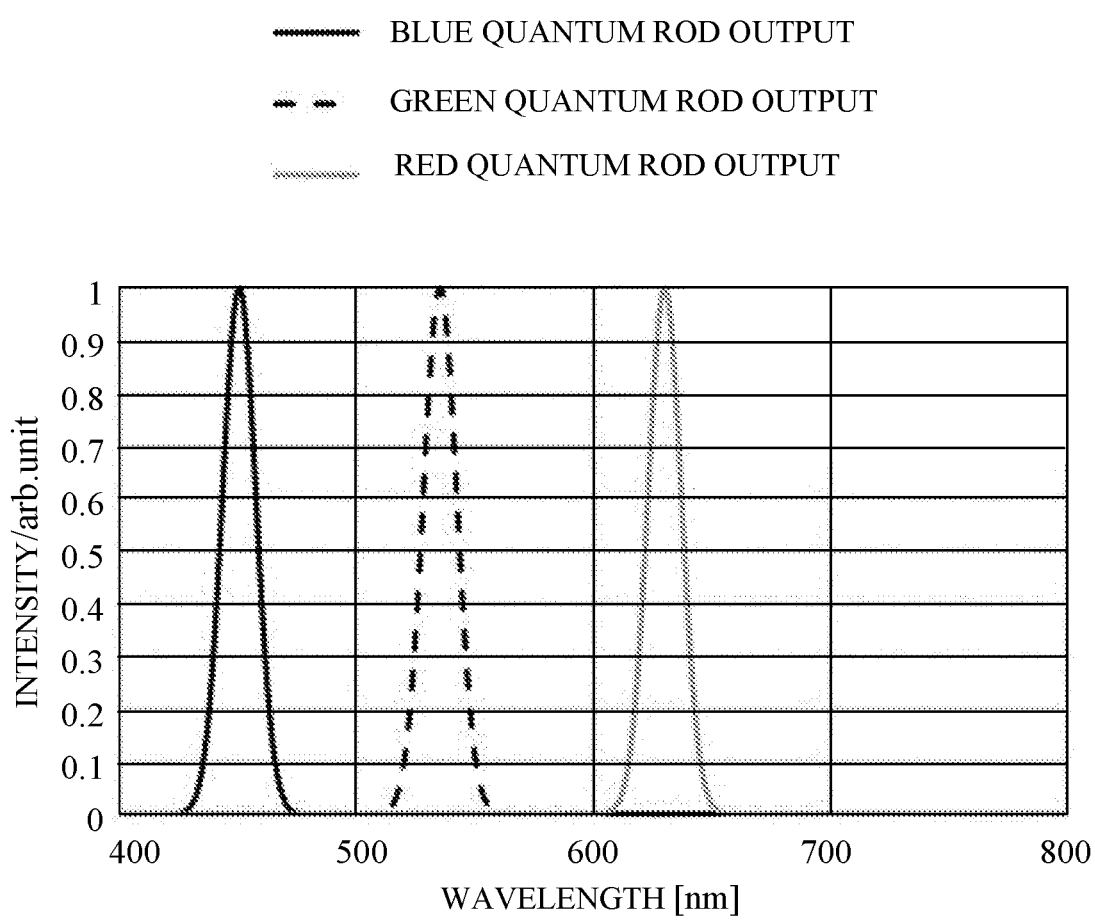
FIG. 13 illustrates a spectrum of fluorescent light according to the ninth embodiment.

The wavelength conversion layer 9051 includes three types of quantum rods, such as a blue quantum rod that emits the blue fluorescent light (second light) by the wavelength conversion of the ultraviolet light, a green quantum rod that emits the green fluorescent light (third light), and a red quantum rod that emits the red fluorescent light (fourth light). The longitudinal directions (polarization directions of fluorescent light) of these three types of quantum rods coincide with the polarization direction of the excitation light. When the wavelength conversion layer 9051 includes these three types of quantum rods, a spectrum of the light emitted from the wavelength conversion element 905 becomes a spectrum including three colors of red, green, and blue, as illustrated in FIG. 13, or white linear polarization light as a whole. The types of quantum rods included in the wavelength conversion layer 9051 are not limited to the above three types, and the wavelength conversion layer 9051 may include more than three types of quantum rods.

Among the fluorescent light generated in the wavelength conversion layer 9051, the component directed to the reflective plate 9052 is reflected by the reflection plate 9052, transmits through the wavelength conversion layer 9051, and travels to the dichroic mirror 903. The dichroic mirror 903 has a characteristic of transmitting visible light, and the fluorescent light passes through the dichroic mirror 903 as it is and travels to the outside of the light source unit 100D.

This configuration can realize the light source unit 100D that generates white light as the linear polarization light.

Even in this embodiment, similar to the second embodiment, the excitation light may transmit through the dichroic mirror 903 and enter the wavelength conversion element 905, and the fluorescent light from the wavelength conversion element 905 may be reflected by the dichroic mirror 903 and emitted from the light source unit.

Tenth Embodiment

Figure 14:
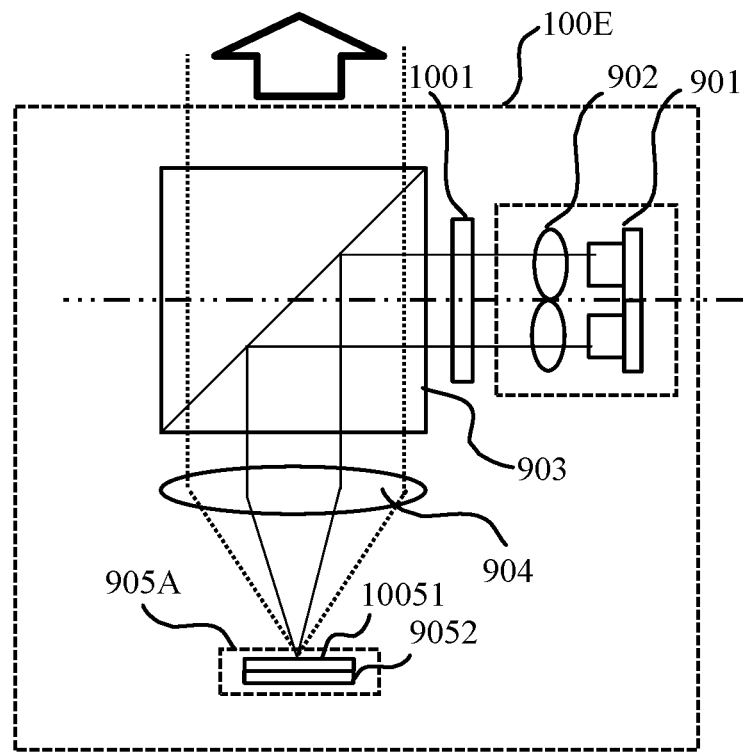
FIG. 14 illustrates a configuration of a light source apparatus according to a tenth embodiment of the present invention.

FIG. 14 illustrates a configuration of a light source unit 100E according to tenth embodiment of the present invention. This embodiment disposes a rotatable half wavelength plate (color adjustment element) 1001 just after the light source 901 in the same configuration as that of ninth embodiment and changes the polarization direction of the excitation light as the linear polarization light. A wavelength converter 905A in this embodiment includes a wavelength conversion layer 10051 in place of the wavelength conversion layer 9051 in the wavelength conversion element 905 according to the ninth embodiment, and further includes a reflective plate 9052.

Figure 15:
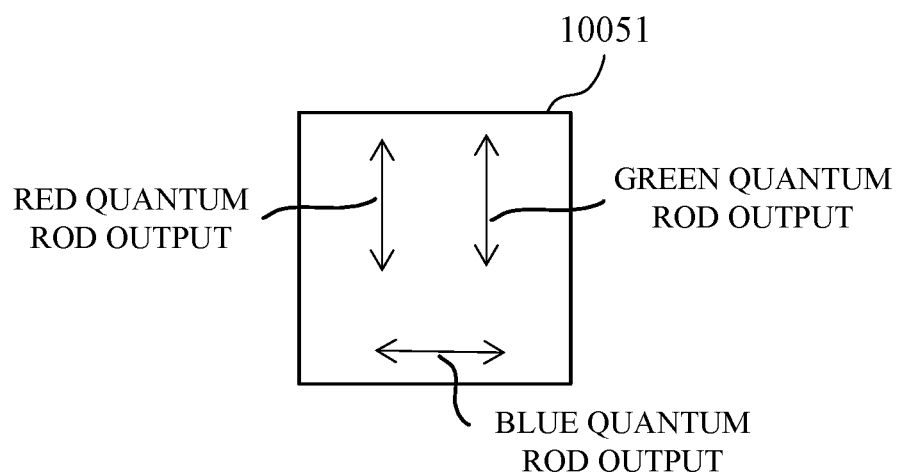
FIG. 15 illustrates an arrangement of quantum rods according to the tenth embodiment.

Similar to the wavelength conversion layer 9051, the wavelength conversion layer 10051 includes three types of quantum rods, such as a blue quantum rod that emits the blue fluorescent light by the wavelength conversion of the ultraviolet light, a green quantum rod that emits the green fluorescent light, and a red that emits the red fluorescent light. However, as illustrated in FIG. 15, the longitudinal direction (polarization direction of the blue fluorescent light) of the blue quantum rod in the wavelength conversion layer 10051 is orthogonal to the longitudinal directions of the green quantum rod and the red quantum rod.

Among the excitation light incident on the wavelength conversion layer 10051, the component having a polarization direction parallel to the longitudinal direction of the blue quantum rod receives the wavelength conversion by the blue quantum rod and turns into the blue light as the linear polarization light. The components in the excitation light which are parallel to the longitudinal directions of the green quantum rod and the red quantum rod receive the wavelength conversion by the green quantum rod and the red quantum rod and turn into the green light and red light as the linear polarization light, respectively. As a result, white light is generated while the polarization direction of the blue light and the polarization directions of the green light and red light are different from each other. As the rotational position of the half wavelength plate 1001 is adjusted, a ratio can be changed of a component of the polarization direction of the excitation light entering the wavelength conversion layer 10051 which is parallel to the longitudinal direction of the blue quantum rod and a component of it which is parallel to the longitudinal directions of the green and red quantum rods. Thereby, the chromaticity of the fluorescent light emitted from the wavelength conversion layer 10051 can be adjusted, and the tint of the white light can be adjusted.

This embodiment makes different the longitudinal direction of the blue quantum rod from the longitudinal directions of the green quantum rod and the red quantum rod, but the color of the quantum rod may not be blue which has a polarization direction different from the polarization directions of the two other color light fluxes.

Even in this embodiment, similar to the second embodiment, the excitation light transmits through the dichroic mirror 903 and enters the wavelength conversion element 905, and the fluorescent light from the wavelength conversion element 905 is reflected by the dichroic mirror 903 and emitted from the light source unit 100E.

Eleventh Embodiment

Figure 16:
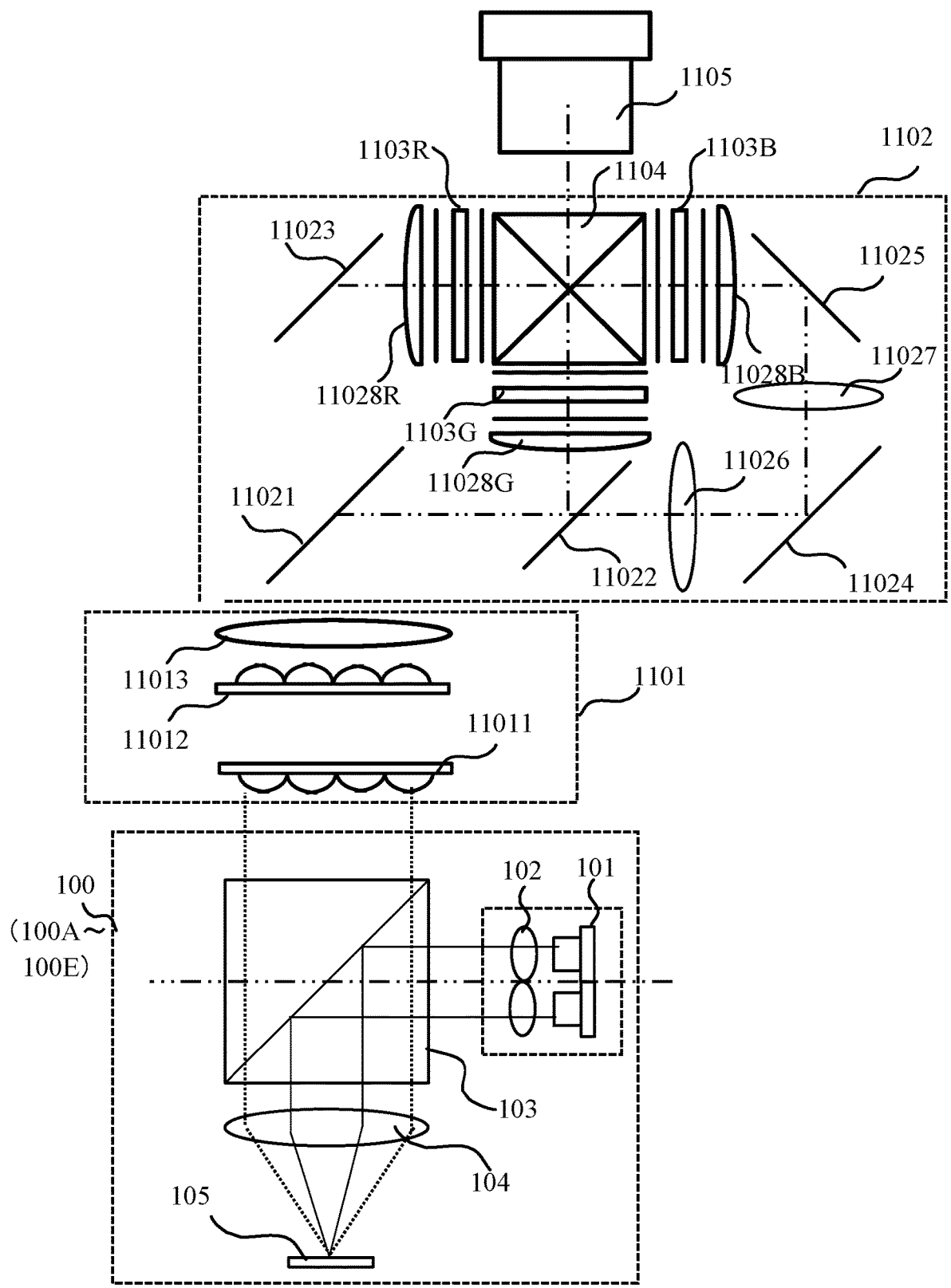
FIG. 16 illustrates a configuration of a light source apparatus according to an eleventh embodiment of the present invention.

FIG. 16 illustrates a configuration of a projector as an image projection apparatus using the light source unit 100 described in the first embodiment. The projector includes a light source unit 100, an illumination optical system 1101, a color separating and guiding optical system 1102, light modulation elements 1103R, 1103G, and 1103B, a color combining cross dichroic prism 1104, and a projection optical system 1105. In place of the light source unit 100, any one of the light source units 100A to 100D described in the second and tenth embodiments may be used.

The light modulation elements 1103R, 1103G, and 1103B are made of transmission type liquid crystal display elements, and configured to modulate the incident red light, green light, and blue light based on the image signal input to the projector. An incident side polarizing plate 1106 is disposed on the light incident side of each of the light modulation elements 1103R, 1103G, and 1103B, and an exit side polarizing plate 1107 is disposed on the light exit side of the light modulation elements 1103R, 1103G, and 1103B.

While FIG. 16 illustrates the transmission type liquid crystal display element used as a light modulation element, a reflection type liquid crystal display element or a digital micro mirror device may be used as the light modulation element.

The illumination optical system 1101 includes a first lens array 11011, a second lens array 11012, and a condenser lens 11013. The first lens array 11011 has a plurality of lens cells for dividing the light from the light source unit 100 into a plurality of partial light beams (or fluxes). The plurality of lens cells are arranged in a matrix on a plane orthogonal to the optical axis (illumination optical axis) in the illumination optical system 1101.

The second lens array 11012 has a plurality of lens cells one by one corresponding to the plurality of lens cells of the first lens array 11011. The plurality of lens cells are also arranged in a matrix on a plane orthogonal to the illumination optical axis. The second lens array 11012 forms an image of each lens cell of the first lens array 11011 near the light modulation elements 1103R, 1103G, and 1103B, together with the condenser lens 11013.

The condenser lens 11013 condenses the plurality of partial light fluxes from the second lens array 15 and superimposes them on the light modulation elements 1103R, 1103G, and 1103B. The first lens array 11011, the second lens array 11012, and the condenser lens 11013 constitute an integrator optical system that makes uniform the intensity distribution of the light from the light source unit 100.

The color separating and guiding optical system 1102 includes dichroic mirrors 11021 and 11022, mirrors 11023, 11024, and 11025, and relay lenses 11026 and 11027. The color separating and guiding optical system 1102 separates the white light from the illumination optical system 1101 into the red light, the green light, and the blue light, and the light modulation elements 1103R, 1103G, and 1103B corresponding to these red light, green light, and blue light, respectively. Condenser lenses 11028R, 11028G, and 11028B are disposed between the color separating and guiding optical system 1102 and the light modulation elements 1103R, 1103G, and 1103B.

The dichroic mirror 11021 transmits the red light and reflects the green light and blue light. The dichroic mirror 11022 reflects the green light and transmits the blue light. The mirror 11023 reflects the red light. The mirrors 11024 and 11025 reflect blue light.

The red light that has transmitted through the dichroic mirror 11021 is reflected by the mirror 11023, is condensed by the condensing lens 11028R, and enters the red light modulation element 1103R. The green light reflected by the dichroic mirror 11021 is further reflected by the dichroic mirror 11022, is condensed by the condensing lens 11028G, and enters the green light modulation element 1103G. The blue light that has transmitted through the dichroic mirror 11022 passes through the relay lens 11026, the mirror 11024 on the incident side, the relay lens 11027, and the mirror 11025 on the exit side, is condensed by the condensing lens 11028B, and enters the light modulation element 1103B.

The cross dichroic prism 1104 combines the red, green and blue image light fluxes emitted from the light modulation elements 1103R, 1103G and 1103B with one another. The combined light emitted from the cross dichroic prism 1104 is enlarged and projected onto a projection surface such as a screen by the projection optical system 1105. Thereby, the projection image as a color image is displayed.

Each embodiment can eliminate a polarization conversion element, and realize a light source apparatus with a high light utilization efficiency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-94136, filed on May 15, 2018, which is hereby incorporated by reference herein in its entirety.

What is claimed is:

1. A light source apparatus comprising:
a light emitting element configured to emit first light;
a wavelength conversion element configured to convert part of the first light into second light having a wavelength different from a wavelength of the first light, and to emit the second light and unconverted light that is the first light which is not converted into the second light; and
an optical element configured to cause the first light to enter the wavelength conversion element, and the second light and the unconverted light from the wavelength conversion element to travel in a direction different from a direction of the light emitting element, wherein the wavelength conversion element emits mixed light of the second light as linear polarization light and the unconverted light as linear polarization light, and wherein a polarization direction of the unconverted light is perpendicular to a polarization direction of the first light.

2. The light source apparatus according to claim 1, wherein the wavelength conversion element includes a quantum rod.

3. The light source apparatus according to claim 1, wherein the wavelength conversion element includes, from an incident side of the first light, at least a wavelength converter configured to convert the part of the first light into the second light, and a reflector configured to reflect the unconverted light.

4. The light source apparatus according to claim 3, wherein the reflector diffuses the unconverted light.

5. The light source apparatus according to claim 1, wherein each of the first light, the second light, and the unconverted light is the linear polarization light, and wherein the optical element reflects the first light and transmits the second light and the unconverted light, or transmits the first light and reflects the second light and the unconverted light.

6. The light source apparatus according to claim 3, further comprising, between the wavelength converter and the reflector, a polarization rotator configured to rotate a polarization direction of the unconverted light that passes through the wavelength converter, is reflected by the reflector, and passes through the wavelength converter again so that the polarization direction of the unconverted light is different from a polarization direction of the first light.

7. The light source apparatus according to claim 6, further comprising a dichroic mirror configured to reflect the second light and to transmit the unconverted light, between the wavelength converter and the polarization rotator.

8. The light source apparatus according to claim 6, wherein the polarization rotator does not rotate the polarization direction of the second light that is generated by the wavelength converter and reflected by the reflector and passes through the wavelength converter again.

9. A light source apparatus comprising:
a light emitting element configured to emit first light;
a wavelength conversion element configured to convert the first light into second light, third light and fourth light having wavelengths different from a wavelength of the first light and from one another;
an optical element configured to cause the first light to enter the wavelength conversion element, and the second light, the third light, and the fourth light from the wavelength conversion element to travel in a direction different from that of the light emitting element; and
a color adjustment element configured to rotate and change a ratio among the second light, the third light, and the fourth light and disposed between the light emitting element and the wavelength conversion element,
wherein the wavelength conversion element emits mixed light of the second light as linear polarization light, the third light as linear polarization light, and the fourth light as linear polarization light.

10. An image projection apparatus comprising a light source apparatus; and a light modulation element configured to modulate light from the light source apparatus, the image projection apparatus being configured to project image light from the light modulation element onto a projection surface,
wherein the light source apparatus includes:
a light emitting element configured to emit first light;
a wavelength conversion element configured to convert part of the first light into second light having a wavelength different from that of the first light, and to emit the second light and unconverted light that is the first light which is not converted into the second light; and
an optical element configured to cause the first light to enter the wavelength conversion element, and the second light and the unconverted light from the wavelength conversion element to travel in a direction different from a direction of the light emitting element,
wherein the wavelength conversion element emits mixed light of the second light as linear polarization light and the unconverted light as linear polarization light, and
wherein a polarization direction of the unconverted light is perpendicular to a polarization direction of the first light.

11. An image projection apparatus comprising a light source apparatus and a light modulation element configured to modulate light from the light source apparatus, the image projection apparatus being configured to project image light from the light modulation element onto a projection surface,
wherein the light source apparatus includes:
a light emitting element configured to emit first light;
a wavelength conversion element configured to convert the first light into second light, third light and fourth light having wavelengths different from a wavelength of the first light and from one another;
an optical element configured to cause the first light to enter the wavelength conversion element, and the second light, the third light, and the fourth light from the wavelength conversion element to travel in a direction different from that of the light emitting element; and
a color adjustment element configured to rotate and change a ratio among the second light, the third light, and the fourth light and disposed between the light emitting element and the wavelength conversion element, and
wherein the wavelength conversion element emits mixed light of the second light as linear polarization light, the third light as linear polarization light, and the fourth light as linear polarization light.

* * * * *